United States Patent [19]

Fromm

[11] 4,322,978
[45] Apr. 6, 1982

[54] OPTICAL DEVICE FOR MEASURING SLIGHT PRESSURE DIFFERENCES BY MEANS OF LIGHT INTENSITY CHANGES

[75] Inventor: Ingrid Fromm, Munich, Fed. Rep. of Germany

[73] Assignee: Siemens Aktiengesellschaft, Berlin & Munich, Fed. Rep. of Germany

[21] Appl. No.: 181,697

[22] Filed: Aug. 27, 1980

[30] Foreign Application Priority Data

Sep. 17, 1979 [DE] Fed. Rep. of Germany ....... 2937511

[51] Int. Cl.³ .............................................. G01L 9/00
[52] U.S. Cl. ...................................... 73/705; 73/723; 356/376
[58] Field of Search .................. 73/705, 723; 356/376; 350/485, 96.19

[56] References Cited

U.S. PATENT DOCUMENTS

| | | | |
|---|---|---|---|
| 3,215,135 | 11/1965 | Franke | 73/715 |
| 3,273,447 | 9/1966 | Frank | 73/705 |
| 3,503,116 | 3/1970 | Strack | 73/705 |

*Primary Examiner*—Donald O. Woodiel

*Attorney, Agent, or Firm*—Hill, Van Santen, Steadman, Chiara & Simpson

[57] ABSTRACT

An optical device for measuring both slight positive and negative pressure differences by means of a light intensity change characterized by a gradient lens having a first and second end face being mounted in a housing part with a second end face spaced from a partially reflective membrane which is secured to the housing part to form a first chamber of a first volume and a second chamber of a second volume. An input waveguide such as an optical fiber is connected to a light source and is connected to the first end face of the lens and a pair of output waveguides are coupled to the first end face at two points displaced from the input fiber and a separate light intensity evaluation device connected to each of the output waveguides so that both positive and negative changes in pressure between the two chambers causes the membrane to be flexed and cause a reflective surface to move from a parallel position to cause a reflected image point of the input waveguide to move along the first end face with positive changes of pressure cause an increase of the intensity of the light being received by the one output waveguide and a negative pressure change causing the increased intensity in the other waveguide.

19 Claims, 2 Drawing Figures

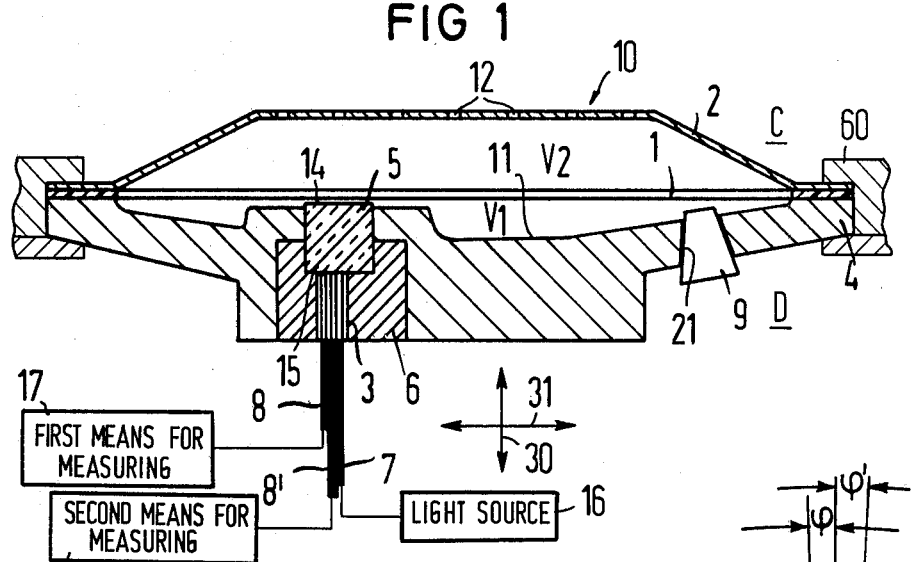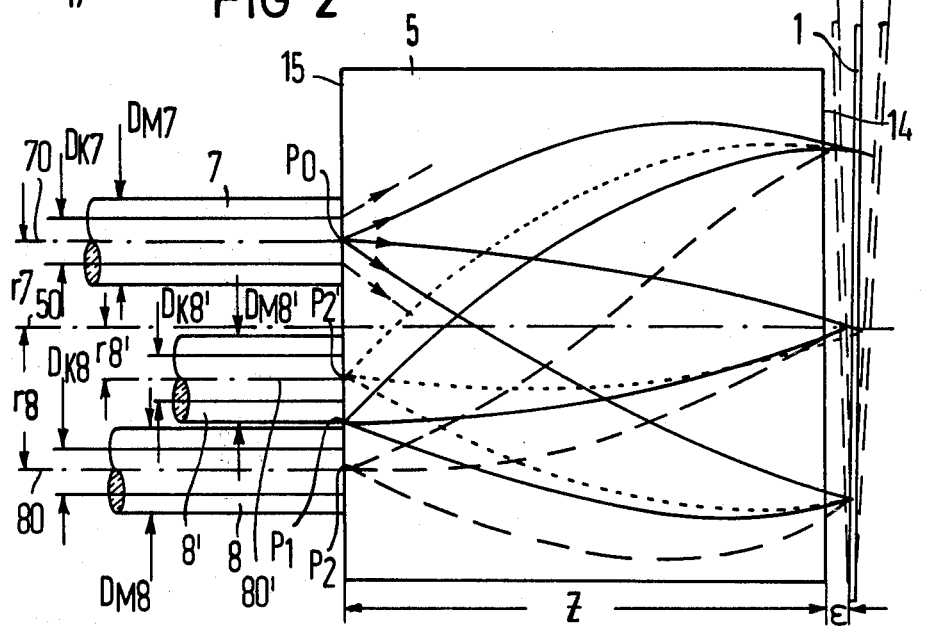

OPTICAL DEVICE FOR MEASURING SLIGHT PRESSURE DIFFERENCES BY MEANS OF LIGHT INTENSITY CHANGES

BACKGROUND OF THE INVENTION

The present invention is directed to an optical device for measuring slight pressure differences by means of a change of light intensity.

Up to now, measurement of a pressure difference essentially occurs by means of a manometer in which the movement of a membrane is directly employed to actuate a display device and/or a controlled mechanism. In addition to the pressure measuring devices, which are equipped with a membrane, pressure-measuring devices are known which devices function in accordance to a piezo-ceramic principle. Pressure measuring devices, functioning according to the principle of a membrane deflection, share a common fact that the measured force must be mechanically and directly transmitted and thus their sensitivity is not sufficient for a few specific uses, in particular the measurement of slight pressure differences.

SUMMARY OF THE INVENTION

The object of the present invention is to create an optical device for measuring slight pressure differences in which a direct sampling of the measuring force is not required. In addition the device of the present invention will determine both positive and negative pressure deviations from a predetermined initial pressure by causing a first transmission path for pressure increases and a second transmission path for pressure reductions or decreases.

The objects of the present invention are achieved by an optical device comprising a housing part having a recess; a membrane being secured on said housing part to extend across said recess to form a first chamber of a first volume and having a partially reflective surface facing said first chamber; a protective cap having an opening engaging the other surface of said membrane and forming a second chamber of a second volume opposite said first chamber, said housing part including means for communicating the first chamber with an atmosphere of a desired pressure; a gradient lens with a lens length that amounts to one-fourth of the pitch length, said gradient lens having an axis, a first end face and a second end face; means mounting said gradient lens with the axis of the lens being eccentrically positioned relative to the center of said membrane and the second end face positioned surface parallel to a portion of the reflective surface of the membrane while the membrane is in an idle position and at an interval which is slightly greater than expected maximum excursion of the membrane; an input waveguide, such as cladded core optical fiber, connected to a light source of a predetermined intensity and being coupled to the first end face of the lens at an input point; a first and second output waveguides, which may also be a cladded core optical fibers or a bundle of optical fibers, said first output waveguide being coupled to the first end face at a first point displaced from the input point and the axis of said lens; first means for evaluating the light intensity being connected to the opposite end of the first output waveguide; the second output waveguide being coupled to the first end face at a second point displaced from the input points and between the axis of the lens and said first point, and a second means for evaluating a light intensity being connected to the opposite end of the second output waveguide, said input point and said first and second points being arranged relative to the lens axis so that when the membrane is at an idle position for a given predetermined pressure in the first chamber, a reflected image of the input point falls on the one end face between the first and second points and as the pressure increases in the second chamber relative to the pressure of the first chamber, the reflected image point moves toward the first point and with a pressure reduction in the second chamber relative to the pressure of the first chamber the reflected image point moves towards said second point.

The present invention proceeds from the perception that an excursion of a mirrored membrane surface can be exploited to deflect a light beam. That by measuring the intensity of the deflected or reflected light beam at a given point the changes in the amount of intensity will be a function of the measured pressure which causes the membrane to be flexed or displaced. By measuring the change of intensity at two spaced points, both pressure increases and decreases can be determined.

The invention offers the advantages that the pressure differences of a slight size can be measured. In addition, a relatively quick change of pressure can be measured due to the low mass inertia of the optical device because the membrane is the only moving part. For example, the acoustical pressure measurements can advantageously be undertaken.

An additional advantage of the invention is that a pressure deviation either upward or downward from the predetermined initial reference pressure can be signal by a first and a second transmission channel.

BRIEF DESCRIPTION OF THE DRAWINGS

FIG. 1 is a cross-sectional view of an optical device in accordance with the present invention mounted in a partition; and FIG. 2 is a side view of an optical part and a portion of the membrane to explain the operation of the device.

DESCRIPTION OF THE PREFERRED EMBODIMENTS

The principles of the present invention are particularly useful in an optical device generally indicated at 10 in FIG. 1. The optical device has a housing part 4 with a recess 11. A membrane 1, which for example consists of a thin, stretched synthetic skin, is mounted on the part 4 to extend across the recess 11 to form a first chamber $V_1$. A protective cap 2 having openings 12 engages the other side of the membrane 1 to form a second chamber $V_2$.

A gradient lens 5 is mounted by a mounting means in the part 4 with an end face or surface 14 which is eccentrically positioned relative to the center of the membrane 1 and preferably at a point where the membrane has the maximum angular excursion or deflection. The membrane 1 in the vicinity of the surface 14 is reflective and preferably is provided with a vapor deposited mirror layer.

The gradient lens 5 on a first surface or end face 15, which is opposite the second surface 14 is coupled to an end of an input waveguide 7, which is illustrated as an optical fiber. The optical fiber 7 has the other end extending to a light source 16 so that light can be conveyed through the waveguide 7 to the gradient lens 5. In a similar manner, a first output waveguide 8, and a second output waveguide 8' which also can be optical fibers are coupled to the end surface 15. The first waveguide 8 extends to first means 17 for measuring or evaluating the intensity of the light carried in the waveguide and the second waveguide extends to second means 17' for measuring or evaluating the intensity of the light in the second waveguide 8'. Thus, the light from the source 16 is conveyed by the waveguide 7 to the lens 5 where it is projected at the reflector of the membrane 1 and reflected back through the lens 5 to be received by the output waveguide 8 and 8' depending on the amount and direction of deflection of the membrane 2.

The means for mounting includes a fiber mount 6, which has a groove for receiving the waveguides 7, 8 and 8' which are secured in the mount by an optical adhesive 3. The fibers must be aligned in a definite position with very narrow tolerance with respect to the distance of the fiber axes to one another and the distance of each fiber axis to the lens axis in order for the changes in the propagation direction of the light due to changes of the position of the membrane to change the intensity of the light being output coupled into the fibers 8 and 8'. This alignment can be undertaken for example with the assistance of guidance grooves, which are incorporated in the fiber mount 6. Various known techniques, for example priority etching in silicon exist for the manufacture of these guidance grooves. The membrane 1 material can be made of a known plastic materials such as sold under the tradename KAPTON i.e. Polyimid or a polytetrafluroethylene sold under the trademark TEFLON.

As mentioned hereinabove, changes in the intensity of the light received by the means for measuring 17 or 17' in response to changes in the deflection or excursion of the membrane 1 will produce indications of changes in the pressure. As best illustrated in FIG. 2, the light paths of incoming light conducted by the waveguide 7, which is a cladded optical fiber and the reflected paths are illustrated. The light entering through the input fiber 7, which has a core diameter $D_{K7}$, enters the lens 5 at the surface 15 at an input point $P_0$. The lens 5 has a length Z, which is selected at $Z=Z_0/4$, wherein $Z_0=2\pi/\sqrt{A}$, which is a so called pitch length and in which A is a constant. With the lens length Z, the light of a point light source at the location $P_0$ is transformed into parallel beams at the opposite end face 14 of the gradient lens 5. The membrane 1 preferably has an area of maximum angular excursion positioned at a smaller interval $\epsilon$ when in the idle or at rest position with its face or surface extending parallel to the surface 14. This interval $\epsilon$ should only be slightly greater than the displacement of the membrane 1, which occurred at a maximum excursion angle $\phi$ max, which angle is in a direction of the lens length Z.

When the membrane 1 is in the idle or rest position, the point $P_0$ will be reflected to produce a reflected image point $P_1$ on the surface 15. A position $P_2$ indicates the first passing point for the first output waveguide 8 at the intersection of the axis 80 of the waveguide and the end face 15 and a position $P_{2'}$, indicates the second passing point for the second waveguide 8' whose axis is 80'. The exact position of the points $P_2$ and $P_{2'}$ are selected depending on the position of the fibers relative to the axis 50 of the lens 5. It should be noted that the core diameter $D_{K7}$ for the fiber 7, $D_{K8}$ for the fiber 8, and $D_{K8'}$ for the fiber 8' are illustrated as being the same as well as the cladding diameter $D_{M7}$, $D_{M8}$, and $D_{M8'}$ although they can be different. Also, as illustrated, the spacing intervals or offset $r_7$ between the axis 70 of the fiber 7 and the axis 50 of the lens is different than the intervals $r_8$ for the axis 80 and $r_{8'}$ for the axis 80' relative to the axis 50 of the lens. However, the interval $r_7$ could be selected to be the same as either that the interval $r_8$ or $r_{8'}$ but not the same as both intervals.

As illustrated, when the membrane 1 is in the rest position which is parallel to the plane of the end face 14, the input point $P_0$ is reflected by the membrane 1 to form the reflected image point $P_1$ which is, as illustrated, positioned between the points $P_2$ and $P_{2'}$. When the membrane 1 is moved through an excursion angle $\phi$, which is caused by the pressure in the chamber $V_2$ being greater than the pressure in the chamber $V_1$, the reflected image point $P_1$ is moved on the surface 15 towards the axis 80 of the waveguide 8 with the point being superimposed on the point $P_2$ as shown by the broken lines. In a similar manner, when the pressure in the chamber $V_1$ is greater than the pressure in the chamber $V_2$, so that the diaphragm is deflected away from the surface 14 by an excursion $\phi'$, then the reflected image point $P_1$ will be shifted towards the point $P_{2'}$ of the waveguide 8' as illustrated in dot lines will be superimposed on the point $P_{2'}$.

In this embodiment, a positive deflection to the angle $\phi$, which is due to an increase in the pressure in the chamber $V_2$ over the pressure $V_1$, will cause an increased intensity in the means for measuring the intensity 17. In a similar manner, a negative deflection $\phi'$, which is caused by a reduction of the pressure in the chamber $V_2$ under the pressure in chamber $V_1$, will cause an increased intensity in the second means for measuring 17'. If the two waveguides 8 and 8' are arranged so each receives an equal amount of intensity while the membrane in is an idle position, then an increased pressure in the chamber $V_2$ will cause an increase in the measured intensity by the means 17 with a corresponding decrease in the measured intensity of the means 17'. On the other hand, a reduction in the pressure of the chamber $V_2$ under the pressure in the chamber $V_1$ will cause an increase in the intensity being measured by the second means 17' with the corresponding drop in the intensity measured by the first means 17.

In order to produce as great as possible a displacement of the image point $P_1$ by means of a positive excursion $\phi$ or a negative excursion $\phi'$ the pitch length $Z_0$ should be selected large since the relationship $x' = -x + \phi/(n_0\sqrt{A}) = -x + \phi Z_0/(2\pi n_0)$ exist between the coordinates of the point $P_0$ ($x=r_7$) and its reflected image point $P_1$ ($x'$). The angle $\alpha$ of the beams entering a point $P_0$ are transformed into $\alpha' = -\alpha$ in the case of $Z=Z_0/4$. The $n_0$ indicates the index of refraction on the axis of the gradient lens. With $n_0=1.616$ and $Z_0=20.8$ mm, which are values of commercially known types of gradient lens, an angular excursion $\phi=2.8°$ belongs to a displacement of $\Delta_x=100$ μm.

The output fiber 8 can advantageously be positioned with an axis interval $r_8$ from the axis 50 of the gradient lens 5 enlarged by either the input or output fiber core diameters $D_{K7}$ or $D_{K8}$ respectively.

Further developments of the invention provide that the first output fiber core diameter $D_{K8}$ and the second output fiber core diameter $D_{K8'}$ are both greater than the input fiber core diameter $D_{K7}$. That a diaphragm 19, whose diaphragm diameter is equal to or greater than the input core diameter $D_{K7}$ is arranged between the first end face 15 of gradient lens 5 and the appertaining end face of the two output fibers 8 and 8'. The diaphragm is positioned in such a manner that the image point $P_1$ is covered and therefore when the membrane 1 is in an idle position the reflected light cannot be received by either of output waveguides 8 or 8'.

In an advantageous embodiment, the core diameter $D_{K8}$ of the fiber 8 and the core diameter $D_{K8'}$ of the fiber 8' are both selected so large that for an excursion due to a maximum pressure, the reflected image region of the core of the input fiber 7 still lies in the region of the core of the output fiber 8 and for an excursion $\phi'$ due to a minimum pressure the reflected image of the core of fiber 7 will lie in the region of the core of the fiber 8'. In another embodiment which is not illustrated, it is suggested that both the output waveguides 8 and 8' are replaced by a separate bundle of optical fibers.

In addition to the above mentioned materials sold under the trademark KAPTON i.e. Polyimid and TEFLON, the membrane can be made of another plastic material sold under the trade of HOSTAPHAN i.e. Polyathylen-Terephtalat. This material like the previously two cited materials has sufficient physical properties for the inventive purpose.

For measuring the pressure differences between two volumes, the inventive device can be fastened in a partition 60 which separates two volumes C and D. In this arrangement a plug 9 is removed from an aperture 21 which form means for communicating to the chamber $V_1$ and this chamber $V_1$ is in communication with the volume D. Thus, changes in the pressure of the columes C and D relative to each other will cause changes in the intensity measured by the means for measuring 17.

The inventive optical device 10 can also be utilized as a pure pressure probe. To accomplish this, the first chamber $V_1$ is filled with an auxiliary agent under a reference pressure and then the chamber $V_1$ is isolated from the environment by means of a pressure tight seal or plug 9 being inserted in the aperture 21 of the means for communicating. Thus, the chamber $V_1$ will contain a reference pressure and the device will measure the differences between the reference in the chamber $V_1$ and the ambient pressure which is in communication with the chamber $V_2$.

A light emitting diode such as an LED can be advantageously employed such as a light source 16. In addition, the light source 16 can also use a laser diode so that coherent light is employed.

The optical device 10 allows the measurement of extremely small pressure changes. For estimating the sensitivity one can proceed from the static elastic line of a rigidly clamped membrane.

The component of the re-coupled-in or reflected light to the output waveguide depends on the angular excursion of the membrane at the location of the reflection. The maximum angular excursion $\phi$ max can be derived according to the formula $$Tg\,\phi\,max = \frac{1}{2\sqrt{3}} \frac{p \cdot a^3 (1 - \chi^2)}{E \cdot h^3}$$

wherein p is pressure; a is the membrane radius, $\chi$ is the Poisson number, h is the membrane thickness and E is the modulus of elasticity.

By using this equation, for example a membrane of a material of KAPTON having a thickness of 14 $\mu$m with a 20 mm radius, the pressure changes of 1 bar result in an excursion of the reflected light over the entire fiber radius of approximately 50 $\mu$m.

In another example, the membrane, which may have a radius a in a range of 7.5 to 25 mm and a thickness h in the range of 4 to 20 $\mu$m may be of a material sold under the tradename KAPTON i.e. Polyimid which has a modulus elasticity $E \approx 3000$ N/mm$^2$; a plastic material sold under the tradename HOSTAPHAN i.e. Polyathylen-Terephtalat which has the modulus elasticity $E \approx 4500$ N/mm$^2$ or a polytetrafluoroethylene which is sold under the trademark TEFLON and has a modulus of elasticity of $E \approx 300$ N/mm$^2$.

The sensitivity of the device can be increased by employing thinner membranes and/or by increasing their diameter.

The dynamic range of the pressure measurement, which enables tracing pressure changes as long as the light is not totally reflected onto the outgoing fiber and which range of changes appears to be small, may seem to be a disadvantage. However, this condition can be easily avoided by either selecting the membrane to be insensitive or by providing a different zero position for the membrane 1 by means of a pressure equalization between the chambers $V_1$ and $V_2$.

While the mounting means formed by the mount 6 is illustrated as being fixed in the housing part 4, it can be provided as being adjustable so that the distance or interval between the surface 14 and the membrane 1 can be adjusted along a direction of arrow 30 the amount of eccentric displacement can be adjusted along a direction of arrow 31 so that the lens 5 is placed in different points of angular excursion of the membrane 1.

The present invention enables a separate signaling of either an upward or downward pressure deviation from a predetermined reference preference and thus advantageously allows a particularly simple evaluation for control purposes.

In a similar manner, no high demands are made with regard to the precision of the light intensity being supplied by the source 16 to the input waveguide 7 since all three light intensities prevailing in the input waveguide 7 and the two output waveguides 8 and 8' can be placed in relationship to one another in a simple known manner by using measuring evaluation devices. Then, absolute values of these intensities are largely without significance since the relative change in the intensity is the significant feature.

Although various minor modifications may be suggested by those versed in the art, it should be understood that I wish to embody within the scope of the patent granted hereon, all such modifications as reasonably and properly come within the scope of my contribution to the art.

I claim:

1. An optical device for measuring slight pressure differences by means of a light intensity change, said device comprising a housing part having a recess; a membrane being secured on said housing part to extend across said recess to form a first chamber of a first volume and having a partially reflective surface facing said first chamber; a protective cap having an opening engaging the other surface of said membrane and forming a second chamber of a second volume opposite said first chamber, said housing part including means for communicating the first chamber with an atmosphere of a desired pressure; a gradient lens with a lens length that amounts to one-fourth of the pitch length, said gradient lens having an axis, a first end face and a second end face; means mounting said gradient lens with the axis of the lens being eccentrically positioned relative to a center of said membrane and the second end face being positioned with a surface parallel to a portion of the reflective surface of the membrane while the membrane is in an idle position and at an interval which is slightly greater than the expected maximum excursion of the membrane; an input waveguide connected to a light source of a predetermined intensity and being coupled to the first end face of the lens at an input point, a first output waveguide being coupled to the first end face at a first point displaced from the input point and the axis of said lens; first means for evaluating a light intensity being connected to the opposite end of the first output waveguide; a second output waveguide being coupled to the first end face at a second point displaced from the input point and between the axis of the lens and said first point, and a second means for evaluating a light intensity being connected to the opposite end of the second output waveguide, said input point and said first and second points being arranged relative to the lens axis so that when the membrane is at an idle position for a given predetermined pressure in the first chamber, a reflected image of the input point falls on the one end face between the first and second points and as the pressure increases in the second chamber relative to the pressure of the first chamber, the reflected image point moves toward the first point and with a pressure reduction in the second chamber relative to the pressure of the first chamber the reflected image point moves towards said second point.

2. An optical device according to claim 1, wherein the means for communicating includes a gas tight seal to enable isolating and sealing a predetermined pressure in said first chamber.

3. An optical device according to claim 1, wherein the pitch length of the gradient lens is selected to be so large that a reflected image point displacement is matched to the waveguide geometry and the intervals between said waveguide.

4. An optical device according to claim 1, wherein the means for mounting the gradient lens mounts the second end face of the gradient lens at a location at which the maximum membrane excursion occurs, said membrane being dimensioned and clamped in such a manner that the greatest possible excursion occurs for both positive and negative pressure differentials.

5. An optical device according to claim 1, wherein the means for mounting the gradient lens adjustably mounts the lens to vary the amount of eccentricity between the center of the membrane and the axis of the lens so that the lens may be placed in different locations in which the membrane has a different amount of excursion.

6. An optical device according to claim 1, wherein the input waveguide and the output waveguides are optical fibers, said device includes a fiber mount having guidance grooves for receiving the input and the output fibers with the axis thereof at the predetermined intervals from the axis of the gradient lens, and wherein said fibers are secured in said fiber amount by an adhesive.

7. An optical device according to claim 1, wherein the input waveguide and the output waveguides are cladded core optical fibers having identical core diameters and identical cladding thicknesses, said optical fiber being mounted with the output fiber axis intervals being selected so that a pass point for the optical axis of the first output fiber is identical to the reflected image point of the optical axis of the input fiber when the membrane is in an idle position.

8. An optical device according to claim 7, wherein the optical axis of the first output fiber is positioned at an interval from the axis of the gradient lens which is enlarged by an amount equal to the core diameter of one of said input and first output fibers.

9. An optical device according to claim 1, wherein the input waveguide and the output waveguides are cladded core optical fibers having identical core diameters and identical cladding thicknesses, said optical fibers being mounted with the output fiber axis intervals being selected so that a pass point for the optical axis of the second output fiber is identical to the reflected image point of the optical axis of the input fiber when the membrane is in an idle position.

10. An optical device according to claim 1, wherein the input waveguide and the output waveguides are each optical fibers having a cladded core, said first output fiber core having a diameter greater than the core diameter of the input fiber, a diaphragm having a diameter equal to or greater than the core diameter of the input fiber being arranged on the first end face of the gradient lens between the first and second points and being positioned so that the reflected image point of the core of the input fiber is covered while the membrane is in the idle position.

11. An optical device according to claim 10, wherein the output fibers core diameter are selected to be so large that given an excursion due to a maximum pressure and a minimum pressure, the reflected image region of the core of the input fiber still lies in the region of one of the cores of the output fibers.

12. An optical device according to claim 1, wherein each of the output waveguides comprises a bundle of fibers.

13. An optical device according to claim 1, wherein the membrane consists of a material i.e. Polyimid having a modulus of elasticity $E \approx 3000$ N/mm$^2$, wherein the membrane radius has a range of 7.5 to 25 mm and a membrane thickness h has a range of 4 to 20 $\mu$m.

14. An optical device according to claim 1, wherein the membrane consists of a polytetrafluoroethylene with a modulus of elasticity $E \approx 300$ N/mm$^2$ and wherein the membrane radius has a range of 7.5 to 2.25 mm and a membrane thickness h has a range of 4 to 20 $\mu$m.

15. An optical device according to claim 1, wherein the membrane consists of a material i.e. Polyathylenterephtalat having a modulus of elasticity $E \approx 4500$ N/mm$^2$ and wherein the membrane radius has a range of 7.5 to 25 mm and a membrane thickness has has a range of 4 to 20 $\mu$m.

16. An optical device according to claim 1, wherein the device is mounted in a partition between two volumes under pressure and said means for communicating allows the first chamber to be in communication with one volume at one side of said partition so that said device determines relative pressure changes between the volumes.

17. An optical device according to claim 1, wherein the means for communicating includes a gas tight seal to enable isolating and sealing a predetermined pressure in said first chamber, said second chamber being in communicating with an ambient pressure so that measurement of the difference between the predetermined reference pressure and the ambient pressure are possible.

18. An optical device according to claim 1, wherein the light source is a light emitting diode.

19. An optical device according to claim 1, wherein the light source is a laser diode.

* * * * *